F. H. MERCER & H. F. H. BLEASE.
MANUFACTURE OF PNEUMATIC TIRES.
APPLICATION FILED JUNE 20, 1917.
1,276,942.
Patented Aug. 27, 1918.
4 SHEETS—SHEET 1.
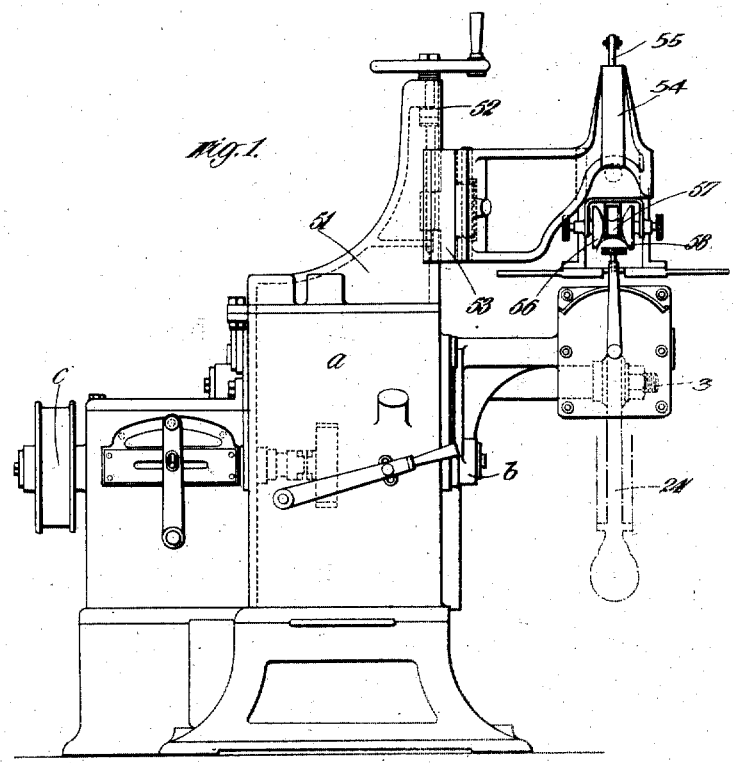
INVENTORS:
Frank Holt Mercer and
Herbert Frederick Hassall Blease
By Attys
Fraser, Dunn & Myers

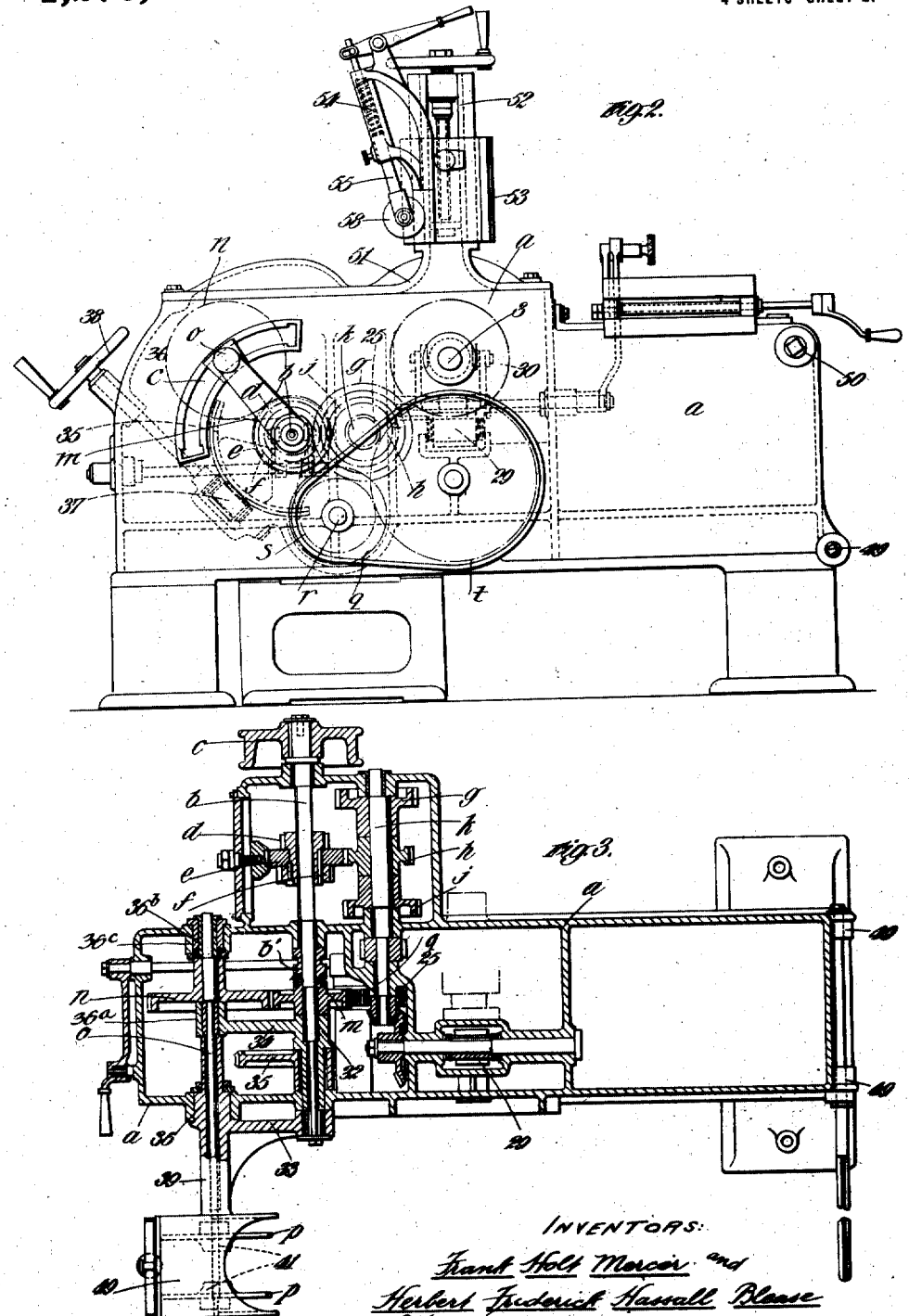

F. H. MERCER & H. F. H. BLEASE.
MANUFACTURE OF PNEUMATIC TIRES.
APPLICATION FILED JUNE 20, 1917.
1,276,942.
Patented Aug. 27, 1918.
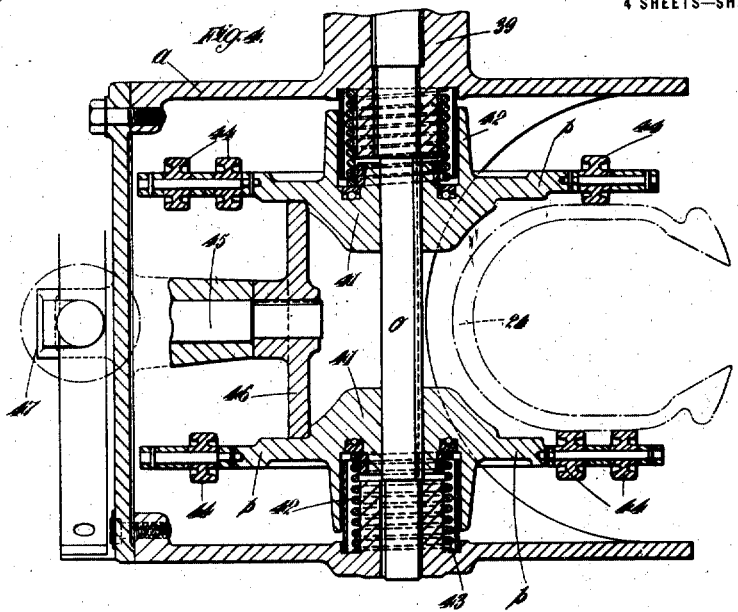
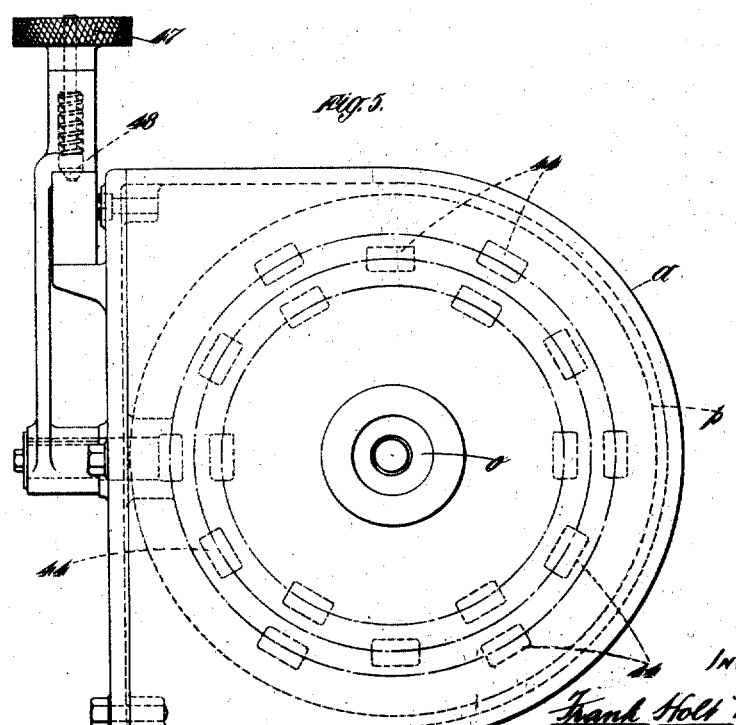

F. H. MERCER & H. F. H. BLEASE.
MANUFACTURE OF PNEUMATIC TIRES.
APPLICATION FILED JUNE 20, 1917.
1,276,942.
Patented Aug. 27, 1918.
4 SHEETS—SHEET 4.
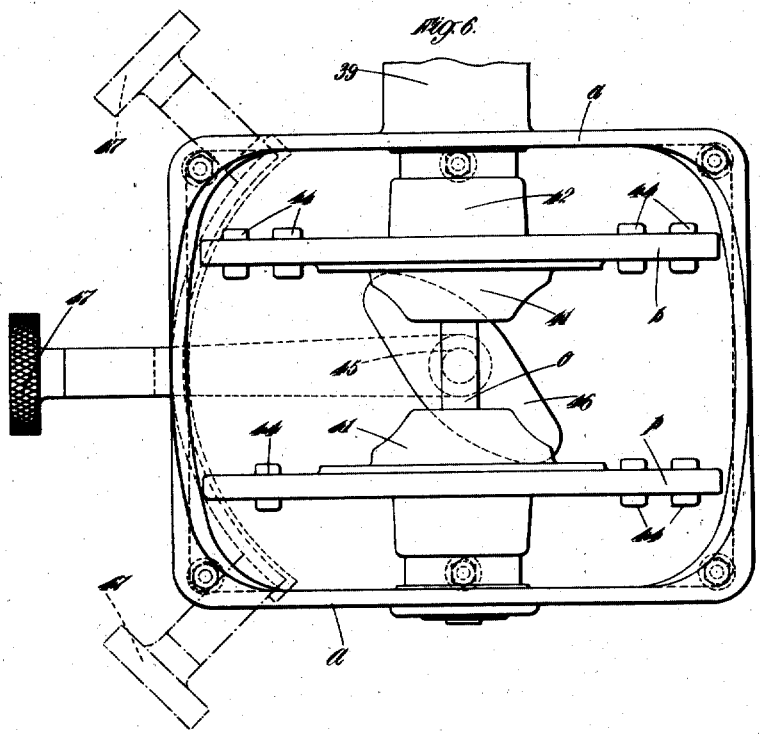

UNITED STATES PATENT OFFICE.

FRANK HOLT MERCER AND HERBERT FREDERICK HASSALL BLEASE, OF MELKSHAM, ENGLAND.

MANUFACTURE OF PNEUMATIC TIRES.

1,276,942.  Specification of Letters Patent.  Patented Aug. 27, 1918.

Application filed June 20, 1917. Serial No. 175,859.

*To all whom it may concern:*

Be it known that we, FRANK HOLT MERCER, mechanical engineer, and HERBERT FREDERICK HASSALL BLEASE, mechanical engineer, both subjects of the King of Great Britain and Ireland, and residents of Melksham, Wiltshire, England, have invented certain new and useful Improvements in or Relating to the Manufacture of Pneumatic Tires, of which the following is a specification.

It is usual to make covers for pneumatic tires of plies or layers of canvas or similar fabric coated with rubber and stretched over a core or forming ring.

This invention relates to an improved means for shaping the fabric in the mechanical production of the covers for pneumatic tires.

According to this invention spring-pressed rotary members are provided in or on which are mounted rollers, adapted to bear against the fabric on the core.

Referring to the accompanying drawings:—

Figure 1 is a side elevation of one form of machine made in accordance with this invention;

Fig. 2 is a front elevation;

Fig. 3 is a sectional plan;

Fig. 4 is a sectional plan showing the rotary member adapted to form the tire in the mold;

Fig. 5 is an elevation of the rotary member; and

Fig. 6 is a plan showing the cam for separating the disks.

On the frame $a$ of the machine is mounted a main shaft $b$ adapted to be driven by a pulley $c$. On the shaft $b$ is mounted toothed speed gear wheels $d$ $e$ $f$ adapted to mesh with gear wheels $g$ $h$ $j$ on the countershaft $k$. On the shaft $b$ is a pinion $m$ adapted to drive the toothed wheel $n$ keyed to the shaft $o$. On the shaft $o$ are two disks $p$ $p$ free to slide thereon, but adapted to be rotated therewith. On the shaft $b$ is a sleeve 32 carrying brackets 33, 34 and a quadrant 35. The shaft $o$ is supported on bearings 36 and $36^a$ on arms 33 and 34 and on bearings $36^b$. The bearings 36 and $36^b$ are constrained by and move in segmental slots $36^c$. On the casing $a$ is mounted a worm 37 gearing with the quadrant 35 and operated by a handle 38 for the purpose of moving the shaft $o$ in the segmental slots $36^c$ and with it the disk $p$, whereby the disks are brought closer to or farther from the shaft on which the core is mounted. On the shaft $k$ is keyed a bevel pinion 25 which is adapted to drive the shaft 3 on which the core 24 is disposed through worm 29 and worm wheel 30 on which the core 24 is disposed. The bracket 33 is formed with an extension 39 having a casing 40 in which are disposed the disks $p$ $p$. Each disk is provided with a boss 41 and sleeve 42. Between each disk $p$ and the wall of the casing is a spring 43 adapted to force the disks toward each other, the amount of movement being limited by the bosses 41, 41, touching each other. On the disks $p$ $p$ are rollers 44, 44, adapted to bear against the fabric placed on the core 24 on which the tire is disposed.

Between the disks $p$ $p$ is disposed a shaft 45 carrying a cam 46 by which the disks can be forced apart against the action of the springs 43, 43.

A handle 47 on the shaft 45 is provided for moving the cam angularly, the spring-pressed stud 48 locking the handle either in a position to keep the disks $p$ $p$ apart or in a position to keep the cam clear of the disks.

In operation the brackets 33, 34 carrying the disks $p$ $p$ on which the rollers 44 are mounted are moved by the hand operated worm and quadrant 37 and 35 to a position so as to be the desired distance from the center of the core, this position may be determined by means of a brass plate fixed on side of machine and marked in a suitable manner for same. By throwing the cam free the rollers will now bear on the sides of the core. The canvas is then pressed on the core which is slowly rotated, the disks are then set in motion, the rollers pressing on the canvas, the disks preferably rotating in the opposite sense to that in which the core is rotated.

On the frame $a$ of the machine are mounted two drums 49, 50 on square shafts.

The drum 50 is wound with strips of rubber coated canvas of convenient length connected together end to end by the adhesiveness of the solution. A strip of muslin is wound on to the roller 50 at the same time to separate the layers of coated canvas and prevent their surfaces adhering to one another. The coated canvas strips are led to and molded on to the core. The strip of plain material is wound on to the drum 49 as the coated canvas is drawn off.

The top cover 51 of the frame $a$ is formed with a guide 52 on which is mounted a slide 53 having a bracket 54 on which is disposed a spring-pressed shank 55 carrying three rollers, 56, 57 and 58 adapted to bear on the crown of the tire being molded.

What we claim as our invention, and desire to secure by Letters Patent, is:—

1. In a machine for molding tire covers on a core adapted to be rotated, brackets pivotally mounted on the machine, a shaft mounted in said brackets, two disks on said shaft free to slide thereon but adapted to be rotated therewith, rollers on said disks adapted to bear against the fabric placed on the core.

2. In a machine provided with disks mounted on a shaft on pivoted brackets as claimed in claim 1, a casing adapted to protect the disks formed on an extension of one of said brackets, a spring between each disk and the wall of the casing, said springs being adapted to force the disks toward each other.

3. In a machine provided with disks mounted on a shaft on pivoted brackets as claimed in claim 1, means for moving the disks apart comprising a cam disposed between the disks and means for moving the cam.

In witness whereof, we have hereunto signed our names in the presence of two subscribing witnesses.

FRANK HOLT MERCER
HERBERT FREDERICK HASSALL BLEASE.

Witnesses:
ARTHUR CARRICK,
GEORGE BELOE ELLIS.